(12) United States Patent
Teramura

(10) Patent No.: US 7,751,056 B2
(45) Date of Patent: *Jul. 6, 2010

(54) OPTICAL COHERENCE TOMOGRAPHIC IMAGING APPARATUS

(75) Inventor: Yuichi Teramura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 181 days.

This patent is subject to a terminal disclaimer.

(21) Appl. No.: 11/941,436

(22) Filed: Nov. 16, 2007

(65) Prior Publication Data

US 2008/0117431 A1    May 22, 2008

(30) Foreign Application Priority Data

Nov. 17, 2006 (JP) ............................. 2006-311287

(51) Int. Cl.
*G01B 9/02* (2006.01)
(52) U.S. Cl. ........................... 356/477; 356/479
(58) Field of Classification Search ............... 356/477, 356/479, 497
See application file for complete search history.

(56) References Cited

U.S. PATENT DOCUMENTS

| 5,892,583 | A | * | 4/1999 | Li | 356/479 |
| 6,665,320 | B1 | | 12/2003 | Arbore et al. | |
| 7,538,884 | B2 | * | 5/2009 | Teramura et al. | 356/489 |
| 2006/0079762 | A1 | * | 4/2006 | Norris et al. | 600/427 |
| 2007/0076217 | A1 | * | 4/2007 | Baker et al. | 356/497 |

FOREIGN PATENT DOCUMENTS

| JP | 2001-264246 A | | 9/2001 |
| JP | 2002-214125 A | | 7/2002 |
| JP | 2006-047264 A | | 2/2006 |
| JP | 2007-163241 A | * | 6/2007 |

OTHER PUBLICATIONS

Mitsuo Takeda, "Optical Frequency Scanning Interference Microscopes", Optics Engineering Contact, 2003, pp. 426-432, vol. 41, No. 7.

* cited by examiner

*Primary Examiner*—Samuel A Turner
(74) *Attorney, Agent, or Firm*—Sughrue Mion, PLLC

(57) ABSTRACT

An optical tomographic imaging apparatus capable of obtaining a high resolution tomographic image rapidly. In the apparatus, light beams having different wavelength ranges with portions of the ranges overlapping with each other are outputted from light source units, each of which is split into measuring and reference beams in each of the beam splitting units. A reflected beam reflected from a measuring object when the measuring beams are irradiated onto the measuring object is combined with the respective reference beams in the respective beam combining units, and a plurality of interference beams generated when the reflected beam is combined with the respective reference beams is detected in the respective interference light detection units, thereby interference signals are generated and a tomographic image is generated using the generated interference signals.

13 Claims, 9 Drawing Sheets

OPTICAL COHERENCE TOMOGRAPHIC IMAGING APPARATUS

BACKGROUND OF THE INVENTION

1. Field of the Invention

The present invention relates to an optical tomographic imaging apparatus for obtaining a tomographic image of a measuring object by OCT (optical coherence tomography) measurement.

2. Description of the Related Art

An optical tomographic image obtaining system using OCT measurement is sometimes used to obtain an optical tomographic image of a living tissue. It is applied to diagnosis of various regions ranging from fundus or anterior chamber of an eye, or skin to the observation of artery wall using a fiber probe or observation of a digestive organ using a fiber probe inserted through the forceps channel of an endoscope. In the optical tomographic image obtaining system, a low coherence light beam outputted from the light source is split into measuring and reference beams, and the measuring beam is irradiated onto a measuring object, then the reflected beam reflected from the measuring object or backscattered light when the measuring beam is irradiated thereon is combined with the reference beam, and an optical tomographic image is obtained based on the intensity of the interference beam between the reflected beam and the reference beam. Hereinafter, reflected beam reflected from a measuring object and backscattered light are collectively referred to as the "reflected beam".

In the mean time, FD (Fourier Domain)-OCT measurement measures the intensity of interference beam with respect to each spectral component of the light without changing the optical path lengths of the reference beam and signal beam, and performs frequency analysis, typically a Fourier transform, on the obtained spectral interference signals using a computer to obtain a reflected beam intensity distribution corresponding to depth positions. The FD-OCT does not require the mechanical scanning used in TD-OCT, so that it has been drawing wide attention as a method that allows high speed measurement.

Typical systems that use FD-OCT measurement are SD-OCT (Spectral Domain OCT) system and SS-OCT (Swept Source OCT) system. The SD-OCT system uses a broadband and low coherence light beam, such as SLD (Super Luminescence Diode), ASE (Amplified Spontaneous Emission), or white light beam, as the light source, and forms an optical tomographic image in the following manner. The broadband and low coherence light beam is split into measuring and reference beams using Michelson interferometer or the like and the measuring beam is irradiated onto a measuring object, then a reflected beam reflected from the measuring object when the measuring beam is irradiated thereon is caused to interfere with the reference beam and the interference beam is broken down into frequency components using a spectrometer, thereafter the intensity of the interference beam with respect to each frequency component is measured using a detector array including elements, such as photodiodes, disposed in an array and an optical tomographic image is formed by performing Fourier transform on the obtained spectral interference signals using a computer.

In the mean time, the SS-OCT system uses a laser that temporally sweeps the optical frequency, in which the reflected beam is caused to interfere with the reference beam at each wavelength, then the temporal waveform of the signal corresponding to the temporal change in the optical frequency is measured and an optical tomographic image is formed by performing Fourier transform on the obtained spectral interference signals using a computer.

For the OCT system, in order to obtain high resolution and high quality image, it is necessary to broaden the wavelength of the light source and to increase the number of corresponding data points. In the SD-OCT system, however, the interference beam is generally detected with respect to each wavelength using a detector array including elements, such as photodiodes, disposed in an array, so that the number of data points is limited by the number of elements of the detector array. At present, it is not desirable to increase the number of elements of the detector array for increasing the number of data points, since such increase would result in cost increase, decreased manufacturability, reduced measuring rate, and the like. On the other hand, in the SS-OCT system, in order to increase the number of data points, for example, it is just necessary to increase the sampling frequency of the circuit that converts an optical current signal from the detector to a digital value if the frequency sweep period of the light source is assumed to be constant, so that it may be realized easily at low cost with a high measuring rate.

In various OCT measurements described above, it is known that the measuring beam with a broad spectral width is used in order to improve spatial resolution as described, for example, in Japanese Unexamined Patent Publication No. 2002-214125. This patent publication discloses a light source including a plurality of light sources, each emitting a light beam having a different spectral range, and an optical coupler for combining the light beams emitted from the respective light sources to emit a single-wave light beam as a light source capable of emitting a light beam having a broad spectral width.

For the SD-OCT measurement, a method for forming a continuous spectrum by combining light beams from a plurality of gain media, each having a overlapping wavelength range with each other, is disclosed in Japanese Unexamined Patent Publication No. 2001-264246. As for the method of forming a continuous spectrum through wavelength combination for SS-OCT, a structure including a plurality of wavelength scanning light sources, each having a gain medium and a wavelength selection element is disclosed in Japanese Unexamined Patent Publication No. 2006-047264. Further, U.S. Pat. No. 6,665,320 discloses a structure that controls light beams from a plurality of gain media using a single wavelength selection element.

Where light beams from a plurality of light sources are combined and used in order to obtain high spatial resolution, a conventional SS-OCT system poses a problem that, when light beams having different wavelengths are outputted from a plurality of light sources and irradiated onto a measuring object at the same time, the interference information provided by the plurality of light beams is mixed up and unable to be detected since the detector of the system includes only a single element.

For this reason, in the systems described in Japanese Unexamined Patent Publication No. 2006-047264, and U.S. Pat. No. 6,665,320, a configuration is adopted in which only a single wavelength is inputted to the detector at a time by controlling the light source or using a switching element. Such method, however, poses a problem that the measuring rate is reduced since it takes time to irradiate all of the wavelengths of the measuring beam, though it may provide broadband light as the measuring beam.

The present invention has been developed in view of the circumstances described above, and it is an object of the present invention to provide an optical tomographic imaging apparatus capable of obtaining a high resolution tomographic image rapidly.

SUMMARY OF THE INVENTION

The optical tomographic imaging apparatus of the present invention is an apparatus including:

a plurality of light source units, each for outputting a light beam having a continuous spectrum within a wavelength range which is different from each other;

a plurality of beam splitting means, each for splitting the light beam outputted from each light source unit into measuring and reference beams;

a plurality of beam combining means, each for combining a reflected beam reflected from a measuring object when the plurality of measuring beams split by the plurality of beam splitting means is irradiated onto the measuring object with each of the plurality of reference beams;

a plurality of interference beam detection means, each for detecting each of a plurality of interference beams generated when the reflected beam is combined with each of the reference beams by each of the beam combining means as an interference signal; and a tomographic image processing means for generating a tomographic image of the measuring object using the plurality of interference signals detected by the plurality of interference beam detection means.

Here, any light source structure may be employed as long as it includes a plurality of light source units, each being capable of outputting a light beam having a different wavelength range with each other in which a continuous spectrum is formed.

Further, the plurality of measuring beams may be irradiated onto the same region of the measuring object at the same time, and each of the beam combining means may combine each of a plurality of light beams obtained by splitting the reflected beam reflected from the measuring object with each of the reference beams.

Preferably, the apparatus further includes a reflected beam splitting means for splitting the reflected beam reflected from the measuring object according to the wavelength range of the light beam of each of the light source units, and each of the beam combining means combines each of the split reflected beams split by the reflected beam splitting means with each of the reference beams corresponding to each of the wavelength ranges of the reflected beam.

The reflected beam splitting means described above may be, for example, a wavelength division multiplexing coupler, dichroic mirror, diffraction grating, or the like.

Preferably, the apparatus further includes a beam dividing means for dividing each of the interference beams generated in each of the beam combining means into halves with the phases thereof shifted by 180 degrees with respect to each other, and each of the interference beam detection means detects each of the halved interference signals to detect the difference between them.

Further, each of the light beams may be a low coherence light beam used for obtaining a tomographic image by the so-called SD-OCT measurement.

Still further, each of the light beams may be a laser beam swept in wavelength within the wavelength range at a constant period used for obtaining a tomographic image by the so-called SS-OCT measurement.

According to the present invention, the optical tomographic imaging apparatus includes a plurality of light source units, each for outputting a light beam having a wavelength range partially overlapping with reach other, and a plurality of interference beam detection means, each for detecting each of a plurality of interference beams based on the light beams outputted from the plurality of different light sources as an interference signal. This allows a plurality of interference signals to be obtained with respect to each of the light beams since light beams from different light sources do not interfere with each other when they are irradiated coaxially onto a measuring object at the same time. This results in a faster measuring rate in comparison with that of the conventional apparatuses, and thereby a high resolution tomographic image may be obtained rapidly. For example, where a tomographic image is obtained by the SS-OCT measurement, in a conventional optical tomographic imaging apparatus having a plurality of light sources or a plurality of gain media, synchronization control is required so that the light with only a single wavelength is inputted to the detector. In contrast, the optical tomographic imaging apparatus of the present invention does not require such control, and the apparatus may be simplified. Further, in the optical tomographic imaging apparatus of the present invention, each interference beam detection means may be optimized in the structure according to the wavelength range of each light beam, thereby the detection accuracy thereof may be enhanced and the resolution of a tomographic image may be improved. Further, the components used in the interference beam detection means need only to deal with the wavelength range of each light beam, and do not need to deal with a broadband light beam, so that the interference beam detection means may be provided inexpensively using general purpose components. In this way, a high quality tomographic image, as in the case where a broadband light beam is used, may be obtained using interference signals obtained from a plurality of light beams outputted from simply structured light source units.

If the reflected beam splitting means for splitting the plurality of reflected beams reflected from the measuring object at the same time according to the wavelength range of each light beam, each interference beam detection means may be structured specific for detecting the interference light within the wavelength range of each light beam. This may improve the utilization efficiency of light, and detection accuracy of each interference beam detection means may be enhanced.

Further, by detecting each interference beam after dividing into halves with the phases thereof shifted by 180 degrees with respect to each other, the offset light component, which is a noninterference component, may be eliminated, which may reduce the influence of light intensity fluctuations and a clear image may be obtained.

DESCRIPTION OF THE PREFERRED EMBODIMENTS

Figure 1:
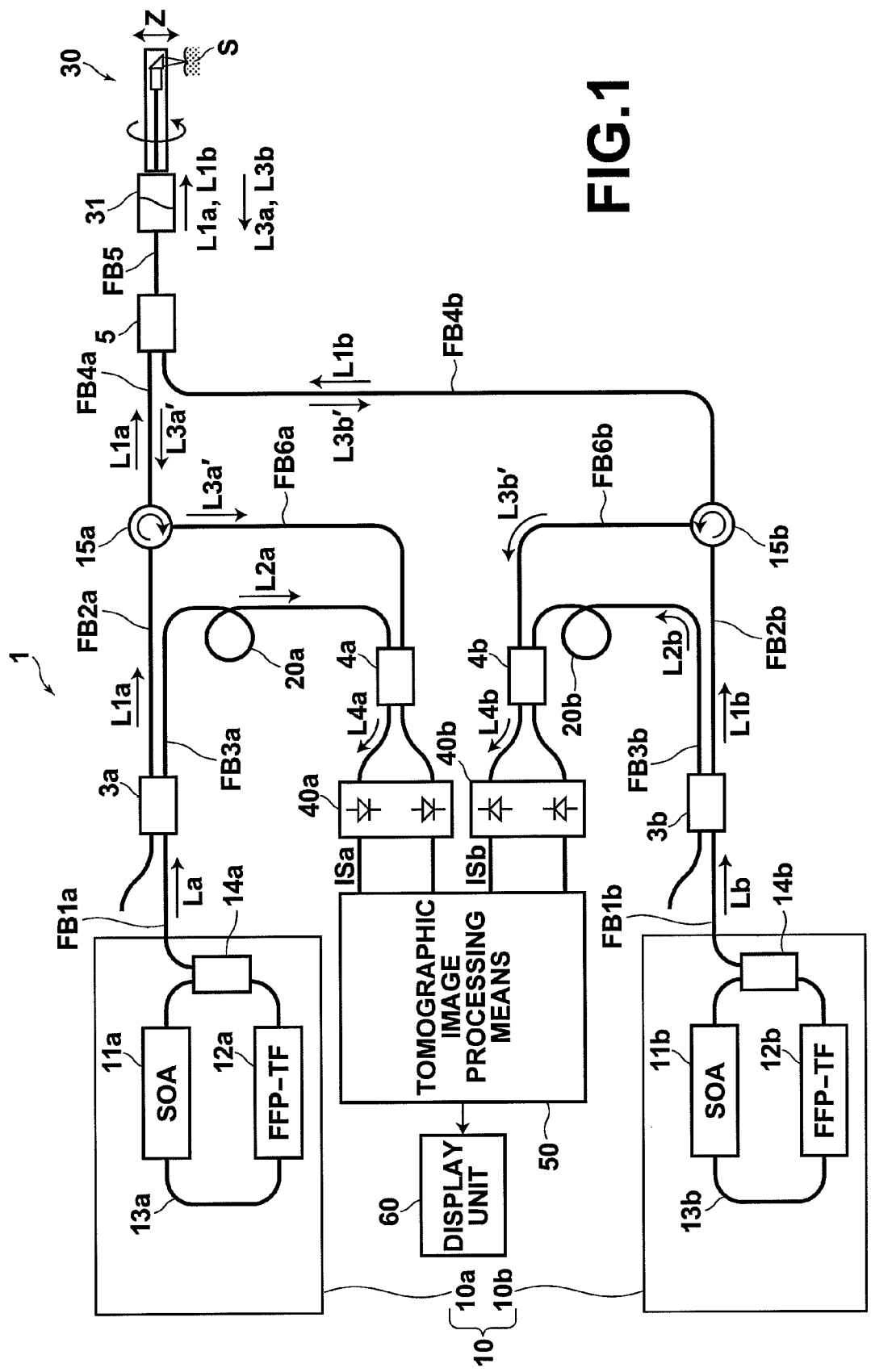
FIG. 1 is a schematic configuration diagram of the optical tomographic imaging apparatus according to a first embodiment of the present invention.

Hereinafter, embodiments of the optical tomographic imaging apparatus of the present invention will be described with reference to the accompanying drawings. FIG. 1 is a schematic configuration diagram of the optical tomographic imaging apparatus 1 according to a first embodiment of the present invention. The optical tomographic imaging apparatus 1 is, fore example, an apparatus for obtaining a tomographic image of a measuring object such as a living tissue or a cell by the aforementioned SS-OCT measurement using a Mach-Zehnder interferometer.

The optical tomographic imaging apparatus 1 includes: light source units 10a and 10b that output light beams La and Lb respectively, each having a different wavelength and variable in wavelength within a predetermined wavelength range; beam splitting means 3a and 3b that split the light beams La and Lb outputted from the light source unit 10a and 10b into a measuring beam L1a and a reference beam L2a, and a measuring beam L1b and a reference beam L2b respectively; and a wavelength combining/splitting means 5 that combines the measuring beams L1a and L1b split by the beam splitting means 3a and 3b. The apparatus 1 further includes: a reflected beam splitting means (wavelength combining/splitting means 5) that splits reflected beams L3a and L3b reflected from a measuring object S when the combined measuring beams L1a and L1b are irradiated onto the measuring object S at a predetermined wavelength; beam combining means 4a and 4b that combines reflected beams L3a' and L3b' split by the reflected beam splitting means (wavelength combining/splitting means 5) with the reference beams L2a and L2b with respect to each light beam; interference beam detection means 40a and 40b that detect interference beam L4a generated when the reflected beam L3a' is combined with the reference beam L2a by the beam combining means 4a as an interference signal ISa and interference beam L4b generated when the reflected beam L3b' is combined with the reference beam L2b by the beam combining means 4b as an interference signal ISb with respect to each light beam; and a tomographic image processing means 50 that obtains a tomographic image of the measuring object S using the interference beams ISa and ISb detected by the interference beam detection means 40a and 40b.

It is noted that the measuring beam L1a, reference beam L2a, reflected beams L3a, L3a', and interference beam L4a are those based on the light beam La and have substantially the same wavelength range as that of the beam La. Likewise, the measuring beam L1b, reference beam L2b, reflected beams L3b, L3b', and interference beam L4b are those based on the beam Lb and have substantially the same wavelength range as that of the beam Lb. Here, the referent of "with respect to each light beam" means a light beam having substantially the same wavelength range as that of the original light beam La or Lb.

The first light source unit 10a is a swept wavelength light source that output a laser beam while sweeping the frequency (wavelength) of the beam at a constant period. The first light source unit 10a includes: a semiconductor optical amplifier (SOA) 11a, which is a gain medium; a wavelength selection means 12a constituted by a FFP-TP (Fiber Fabry Perot-Tunable Filter); and an optical fiber 13a connected to the semiconductor optical amplifier 11 and wavelength selection means 12a, and forming a ring-shaped resonator.

The semiconductor optical amplifier 11 has a function, through injection of drive current therein, to output a weak emission light beam to an optical fiber 13a connected to one end thereof and to amplify a light beam inputted from the optical fiber 13a connected to the other end thereof. By the semiconductor optical amplifier 11a, the laser beam is oscillated in the ring-shaped resonator, which is branched by an optical coupler 14a with a branching ratio of 10:90 connected to the optical fiber 13a, then guided by an optical fiber FB1a, and outputted to outside as the light beam La.

The wavelength selection means 12a is constructed such that the wavelength of the light beam to be transmitted is changeable, which allows the wavelength of the laser beam oscillating in the ring-shaped resonator to be selectable, so that the wavelength may be swept at a constant period.

The second light source unit 10b is structured in the same manner as the first light source unit 10a, and includes: a semiconductor optical amplifier 11b, which is a gain medium; a wavelength selection means 12b constituted by a FFP-TP; and an optical fiber 13b connected to the SOA 11b and FFP-TP 12b, and forming a ring-shaped resonator. The laser beam oscillating in the resonator of the light source 10b is branched by an optical coupler 14b with a branching ratio of 10:90 connected to the optical fiber 13b, then guided by an optical fiber FB1b, and outputted to outside as the light beam Lb. In the light source 10b, wavelength selection is also performed by the wavelength selection means 12b, so that the wavelength may be swept at a constant period. Further, the light source 10b is a light source independent from the light source 10a, having no phase relationship therewith, and the light beams La and Lb do not interfere with each other.

Figure 2A:
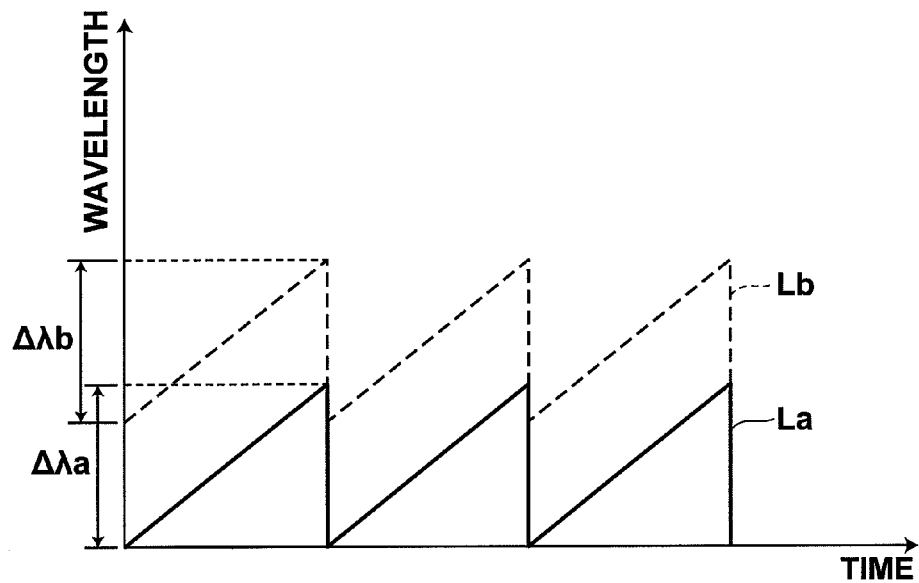
FIG. 2A illustrates wavelength sweeping of the light source unit shown in FIG. 1.
Figure 2B:
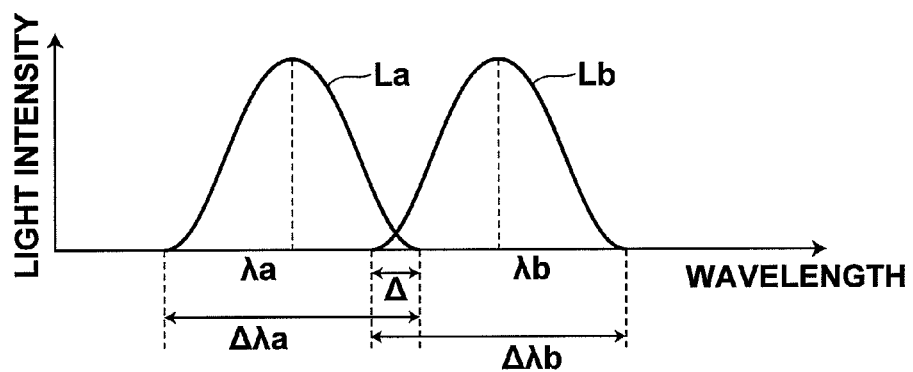
FIG. 2B illustrates the spectrum of the light beam emitted from the light source unit shown in FIG. 1.

Example wavelength sweeping performed in the light sources 10a and 10b is illustrated in FIG. 2A with the reference symbols La and Lb attached thereto. Further, the spectra of the light sources 10a and 10b are illustrated in FIG. 2B with the reference symbols La and Lb attached thereto. The light source 10a outputs the light beam La swept within a wavelength range $\Delta\lambda a$ at a constant period, and the light source 10b outputs the light beam Lb swept within a wavelength range $\Delta\lambda b$ at a constant period during the same time frame. The light beams La and Lb have continuous spectra within the respective wavelength ranges $\Delta\lambda a$ and $\Delta\lambda b$. The wavelength ranges $\Delta\lambda a$ and $\Delta\lambda b$ of the light beams La and Lb outputted from the light sources 10a and 10b differ with each other, and a portion of each of the wavelength ranges overlaps with each other. Hereinafter, specific description will be provided below of a case in which a portion of each of the wavelength ranges overlaps with each other as illustrated in FIG. 2B.

Each of the beam splitting means 3a and 3b shown in FIG. 1 includes, for example, a 2×2 optical coupler with a branching ratio of 90:10. The beam splitting means 3a splits the light beam La into the measuring beam L1a and reference beam L2a, and the beam splitting means 3b splits the light beam Lb into the measuring beam L1b and reference beam L2b. Here, the beam splitting means 3a and 3b split the respective light beams into the measuring and reference beams at a ratio of 90:10.

The probe 30 guides the measuring beams L1a and L1b inputted through the optical connector 31 to the measuring object S and irradiates onto the same region of the measuring object S at the same time. The probe 30 also guides the reflected beams L3a and L3b from the measuring object S when the measuring beams L1a and L1b are irradiated onto the measuring object. The probe 30 is structured such that the fiber section at the distal side of the optical rotary connector 31 is rotated by a not shown motor to circularly scan the beams on the sample, which enables a two dimensional tomographic image measurement. Further, a three dimensional tomographic image measurement is feasible by scanning the tip of the fiber 30 by a not shown motor in the direction orthogonal to the plane formed by the scan circle of the light path. The probe is detachably attached to the optical fiber FB5 through a not shown optical connector. It should be appreciated that the shape of the probe tip and the scanning direction are not limited to those described above. For example, the two dimensional scanning may be performed by providing a high speed scanning mirror at the distal end of the fiber.

The wavelength combining/splitting means 5 is provided in the optical path between the beam splitting means 3a and probe 30, and between the beam splitting means 3b and probe 30. The wavelength combining/splitting means 5 includes, for example, a WDM (Wavelength Division Multiplexing) coupler and has a function to combine/split light beams according to a predetermined cut-off wavelength. The wavelength combining/splitting means 5 combines the measuring beams L1a and L1b inputted from the side of the beam splitting means 3a and 3b respectively, and outputs toward the probe 30. Also, it splits the light beams from the side of the probe 30 into the reflected beams L3a and L3b, and outputs toward the beam combining means 4a and 4b respectively. Here, a dichroic mirror may be used instead of the WDM coupler.

Preferably, the cut-off wavelength of the wavelength combining/splitting means 5 is set at a wavelength approximately corresponding to the intermediate wavelength of the overlapped wavelength range of the light beams La and Lb, that is, the wavelength range Δ shown in FIG. 2B. The use of the WDM coupler as the wavelength combining/splitting means 5 may minimize the reduction in the light utilization efficiency even if the number of light beams to be combined is increased.

Setting of the cut-off wavelength at a wavelength within the wavelength range Δ where the original measuring beams L1a and L1b are overlapped results in that the most of the reflected beam L3a is guided to the side of the original light source La, and most of the reflected beam L3b is guided to the side of the original light source Lb. A portion of the light adjacent to the cut-off wavelength, however, is returned to the opposite light source side.

Figure 3:
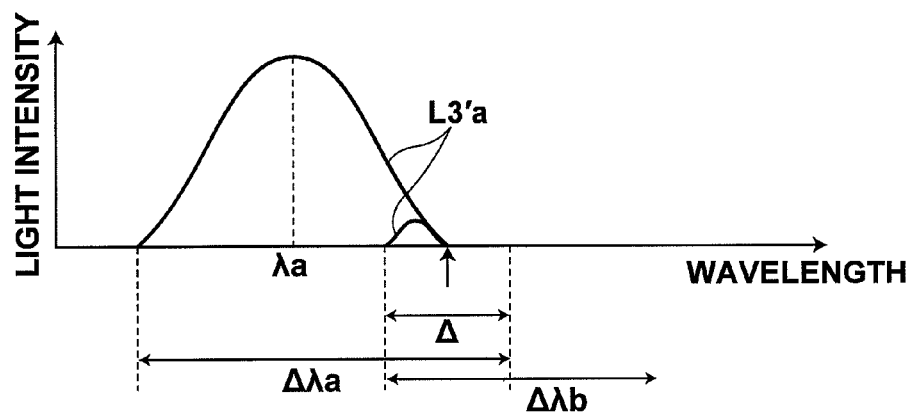
FIG. 3 illustrates the spectrum of a reflected beam.

That is, the reflected beams L3a and L3b are split by the wavelength combining/splitting means 5, and one of the split reflected beams becomes reflected beam L3a' constituted by most of the reflected beam L3a and a portion of the reflected beam L3b adjacent to the cut-off wavelength as illustrated in FIG. 3, and combined with the reference beam L2a by the beam combining means 4a. The other of the beams split by the wavelength combining/splitting means 5 becomes reflected beam L3b' constituted by most of the reflected beam L3b and a portion of the reflected beam L3a adjacent to the cut-off wavelength, and combined with the reference beam L2b by the beam combining means 4b.

In the mean time, the reference beams L2a and L2b propagates through independent optical paths without mixing with each other at a distance substantially equal to that of the measuring beam. That is, the light beams La and Lb form independent interferometers respectively, and even if a portion of the light beam Lb is inputted to the interferometer of the light beam La, it never interferes with the light beam La. Likewise, even if a portion of the light beam La is inputted to the interferometer of the light beam Lb, it never interferes with the light beam Lb.

A transmissive optical path length adjustment means 20a is provided in the optical path of the reference beam L2a between the beam splitting means 3a and beam combining means 4a. Likewise, a transmissive optical path length adjustment means 20b is provided in the optical path of the reference beam L2b between the beam splitting means 3b and beam combining means 4b. The optical path length adjustment means 20a and 2b change the optical path lengths of the reference beams L2a and L2b respectively to adjust the starting position of a tomographic image.

Each of the beam combining means 4a and 4b includes, for example, a 2×2 optical fiber coupler with a branching ratio of 50:50. The beam combining means 4a combines the reflected beam L3a' with the reference beam L2a and outputs the interference beam L4a generated therein to the interference beam detection means 40a. Since the light beams La and Lb are those outputted from the different light sources, only the component of the reflected beam L3a of the reflected beam L3a' contributes to the interference with the reference beam L2a, and the component of the reflected beam L3b is the offset light component that does not interfere with the reference beam L2a. The beam combining means 4b combines the reflected beam L3b' with the reference beam L2b and outputs the interference beam L4b generated therein to the interference beam detection means 40b, but only the component of the reflected beam L3b of the reflection beam L3b' contributes to the interference with the reference beam L2b, and the component of reflected beam L3a is the offset light component that does not interfere with the reference beam L2b. Here, the beam combining means 4a and 4b output the interference beams L4a and L4b to the interference beam detection means 40a and 40b respectively by dividing the interference beam into halves. In a 2×2 optical fiber coupler, the phase of light propagated from the input port 1 to the output port 2 or vice versa is shifted by 180°. Thus, the halved interference signals are outputted with a phase difference of 180° between them. The interference beam detection means 40a and 40b respectively perform balanced detection of the halved interference beams L4a and L4b using two light detection elements. In the balanced detection, optical currents generated in the two light detection elements are inputted to a differential amplifier and the difference between them is outputted as a signal. Through the balanced detection, the interference component that varies in the light intensity according to the phase is extracted, and the offset light component, which is the noninterference component that does not vary in the output according to changes in the light phase, is eliminated. This mechanism may eliminate influence of the beam Lb included in the interference beam L4a, and influence of the beam La included in the interference beam L4b, which reduces fluctuations in the light intensity and a clear image may be obtained.

The interference beam detection means 40a and 40b have a function to detect the interference beams L4a and L4b as interference signals ISa and ISb with respect to the wavelength range Δλa and Δλb of the light beams La and Lb respectively by photoelectrically converting the interference beams L4a and L4b. Here, the corresponding light beams may be recognized by synchronizing with the wavelength sweep triggers of the light sources 10a and 10b respectively. At this time, the interference signals ISa and ISb with respect to each spectrum of the light source units 10a and 10b are observed in the interference beam detection means 40a and 40b respectively. The interference signals ISa and ISb are outputted to the tomographic image processing means 50.

Figure 4:
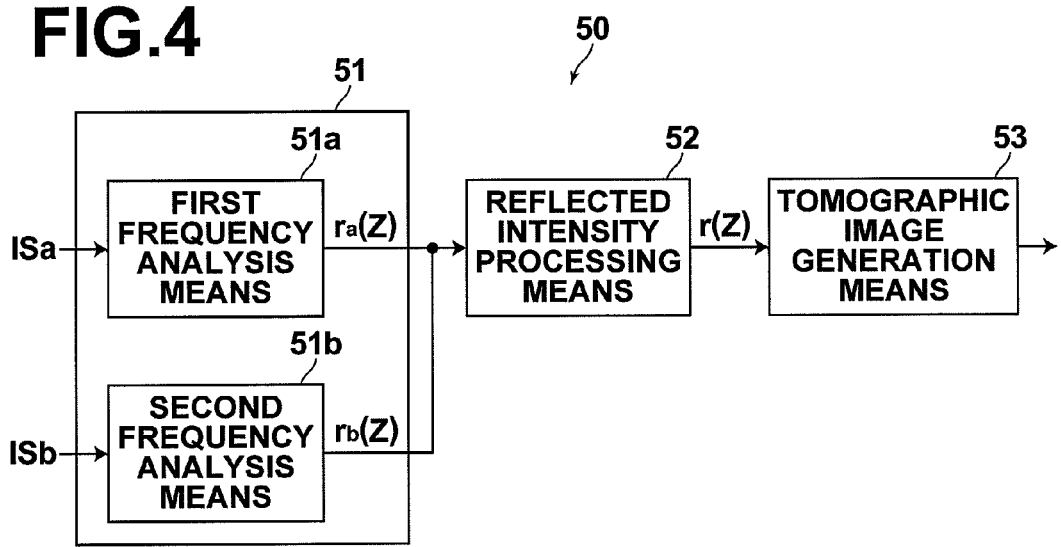
FIG. 4 is a block diagram illustrating an example of tomographic image processing means shown in FIG. 1.

The tomographic image processing means 50 includes, for example, a computer system such as a personal computer. The tomographic image processing means 50 has functions to detect intermediate tomographic information (reflectivities) ra(z) and rb(z) at each dept position of the measuring object S by performing frequency analysis on the interference signals ISa and ISb photoelectrically converted by the interference beam detection means 40, and to obtain a tomographic image of the measuring object using the intermediate tomographic information ra(z) and rb(z). More specifically, the tomographic image processing means 50 includes a frequency analysis means 51 that performs frequency analyses on the interference beams ISa and ISa to detect the intermediate tomographic information ra(z) and rb(z) at each depth position; a tomographic information processing means 52 that generates tomographic information r(z) from the intermediate tomographic information ra(z) and rb(z) detected by the frequency analysis means 51; and a tomographic image generation means 53 that generates a tomographic image using the tomographic information r(z) generated by the tomographic information processing means 52, as illustrated in FIG. 4.

The frequency analysis means 51 includes a first frequency analysis means 51a that performs a frequency analysis on the interference signal ISa to detect the intermediate tomographic information ra(z) which bases on the light beams La, and a second frequency analysis means 51b that performs a frequency analysis on the interference signal ISb to detect the intermediate tomographic information rb(z) which bases on the light beams Lb. Here, a method for calculating the intermediate tomographic information (reflectivity) ra(z) in the first frequency analysis means 51 based on the interference signal ISa will be described briefly. For more detailed description, refer to the literature by M. Takeda, "Optical Frequency Scanning Interference Microscopes", Optics Engineering Contact, Vol. 41, No. 7, pp. 426-432, 2003.

Figure 5:
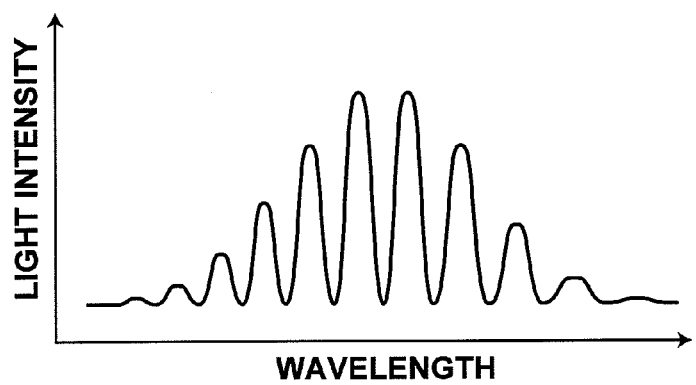
FIG. 5 is a graph illustrating an example of the interference beam detected by the interference beam detection means shown in FIG. 1.
Figure 6:
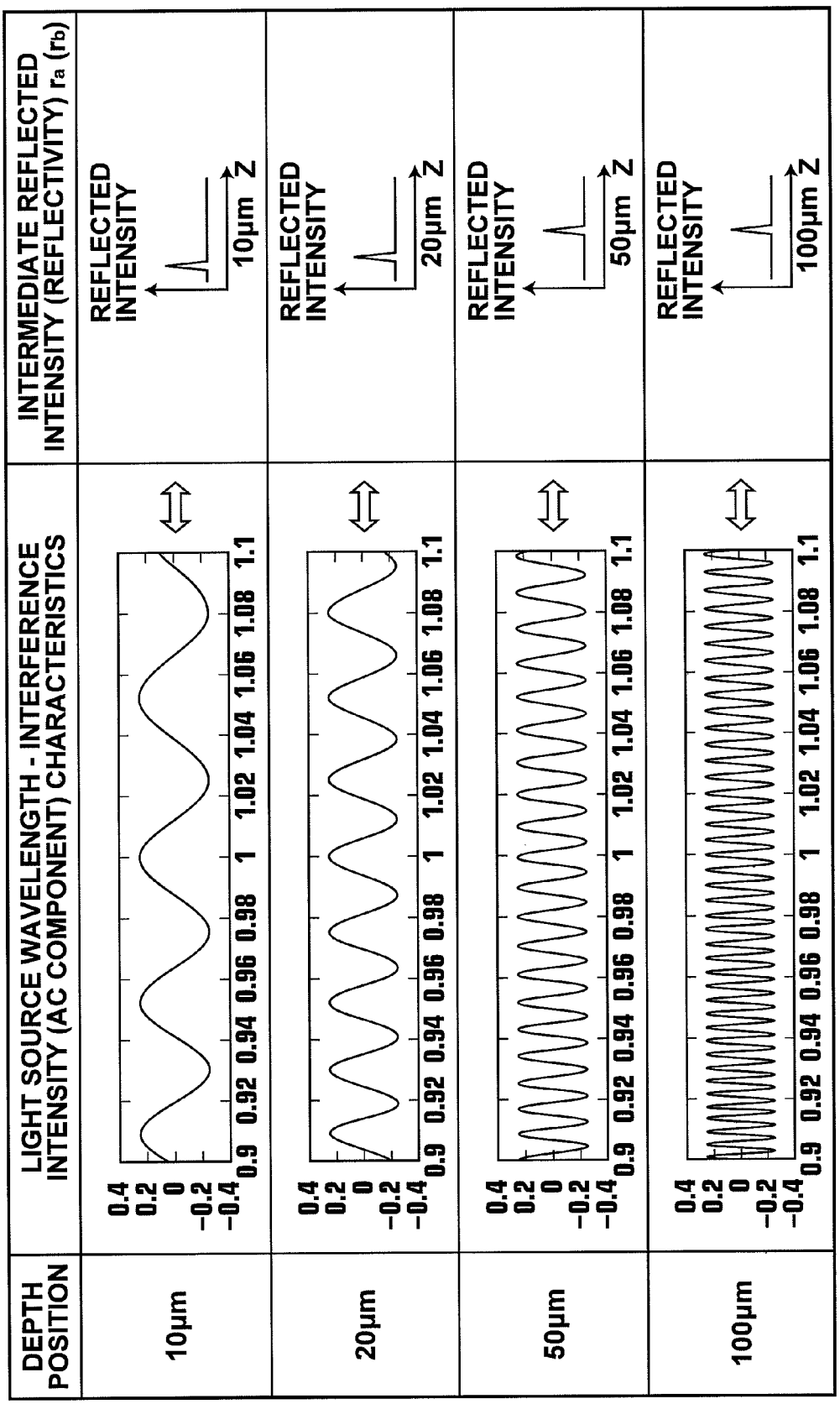
FIG. 6 illustrates tomographic information at each depth when frequency analysis is performed on the interference beam detected by the interference beam detection means shown in FIG. 1.

Assuming the light intensity of the interference pattern with respect to each optical path length difference 1 to be S(1) when the measuring beam L1a is irradiated onto the measuring object S, and reflected beam L3a from each depth of the measuring object interferes with the reference beam L2a with various optical path length differences (dept positions of the measuring object S), the light intensity I(k) detected by the interference beam detection means 40 (40a and 40b) may be expressed in the following and represented, for example, by the graph illustrated in FIG. 5.

$$I(k) = \int_0^\infty S(l)[1 + \cos(kl)]dl \quad (1)$$

where, k is the wave number, l is the optical path length difference between the reference beam L2a and reflected beam L3a. Formula (1) above may be regarded as an interferogram in the optical frequency domain with the wave number k as a parameter. Accordingly, the light intensity S(1) of the interference signal ISa in each wavelength may be determined by performing, in the frequency analysis means 51a, a frequency analysis, through Fourier transform, on the spectral interference pattern detected by the interference beam detection means 40, thereby the reflectivity at each depth position may be obtained, as illustrated in FIG. 6. Then, information of the distance from the measurement start position and the intermediate tomographic information ra(z) are obtained. Likewise, the second frequency analysis means 51b obtains information of the distance from the measurement start position and the intermediate tomographic information rb(z). That is, the intermediate tomographic information ra(z) and the intermediate tomographic information rb(z) are obtained from the same beam-irradiated region of the measuring object S in the frequency analysis means 51. The frequency analysis means 51 may use any known spectral analysis technology such as, for example, maximum entropy measurement (MEM) or Yule-Walker method, other than the Fourier transform described above.

Figure 7:
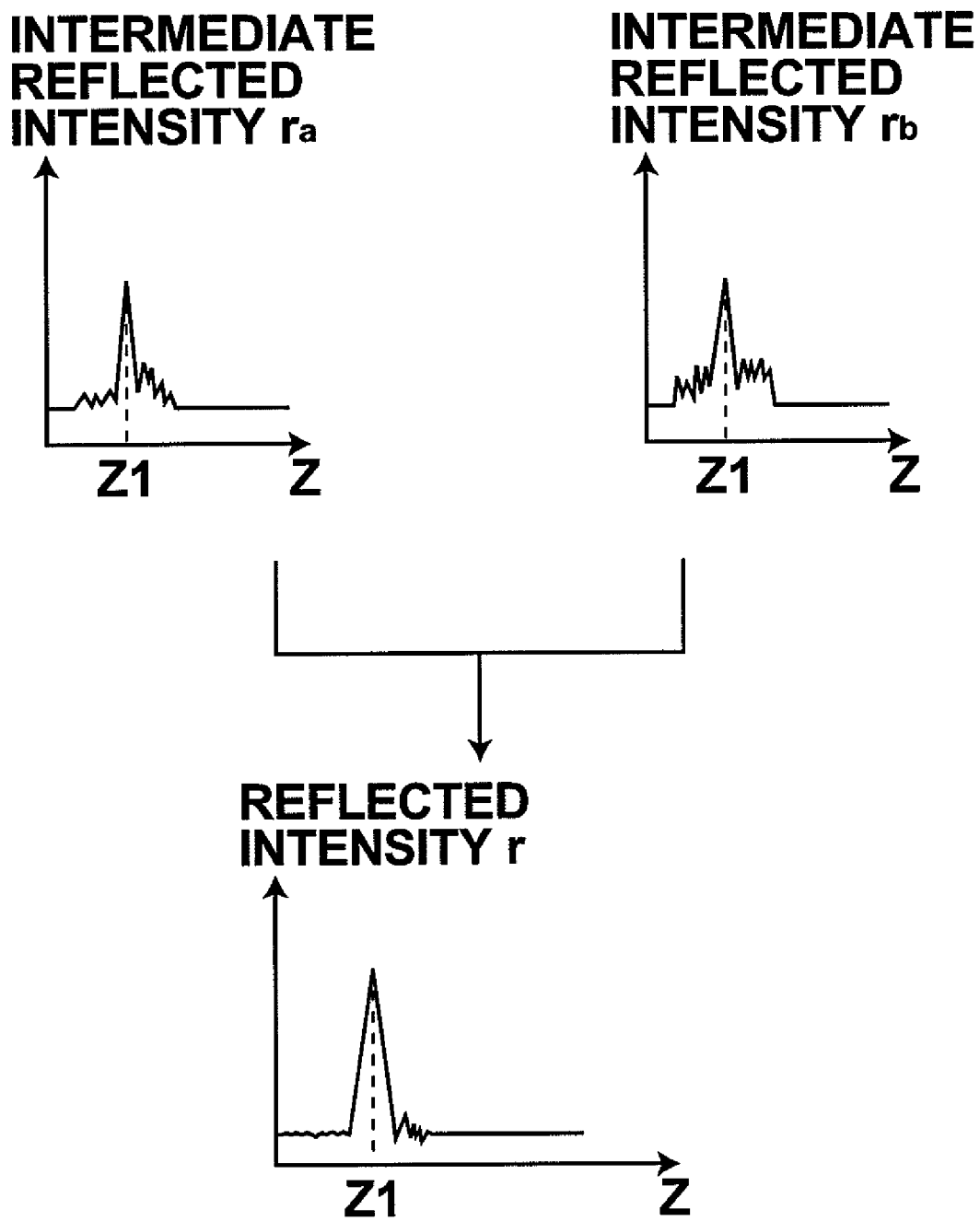
FIG. 7 illustrates a process in which tomographic information used for generating a tomographic image is generated from a plurality of tomographic image information in the tomographic image processing means shown in FIG. 1.

The tomographic information processing means 52 shown in FIG. 4 detects tomographic information r(z) used for generating a tomographic image from the intermediate tomographic information ra(z) and rb(z). More specifically, the tomographic information processing means 52 calculates the average value of the intermediate tomographic information ra(z) and rb(z) at each depth position Z, r(z)=(ra(z)+rb(z))/2, as illustrated in FIG. 7.

The tomographic image generation means 53 generates a tomographic image using the tomographic information r(z) detected by the tomographic information processing means 52. More specifically, each of the measuring beams L1a and L1b is irradiated onto the measuring object S while it is scanned in the direction orthogonal to the depth direction z of the measuring object S. Then, tomographic information with respect to the depth direction at each of a plurality of measuring points is obtained by the tomographic image generation means 53. Then, the tomographic image generation means 53 generates a two or three dimensional tomographic image using the plurality of tomographic information r(z) obtained at the respective measuring points.

In this way, noise component included in the reflectivities ra(z) and rb(z) are cancelled by calculating the average value of the intermediate tomographic information ra(z) and Rb(z) in the tomographic information processing means 52 of the tomographic image processing means 50, which allows a high quality tomographic image to be obtained.

The absolute value of the tomographic information at each depth position z of the measuring object S differs with the wavelength of the measuring beams L1a and L1b irradiated due to various factors, including light absorption/scattering properties of the measuring object S arising from its composition. Since the plurality of measuring beams L1a and L1b is irradiated onto the same region of the measuring object S at the same time, a qualitative property, for example, a peak position where the tomographic information becomes maximum, obtained from a certain depth z1 becomes approximately the same between the intermediate tomographic information ra(z1) and rb(z1).

Consequently, even when the intermediate tomographic information ra(z1) and intermediate tomographic information rb(z1) have different values, noise components included in the respective information may be cancelled and the component representing the tomographic information at the depth position z1 may be emphasized by calculating the average value (r(za)) of the intermediate tomographic information ra(z1) and rb(z1). In this way, by using the discrete light beams La and Lb, instead of a broadband light source, a high quality tomographic image may be obtained.

In the frequency analysis means 51, the sampling pitch with respect to the result of Fourier transform depends on the widths of the wavelength ranges $\Delta\lambda a$ and $\Delta\lambda b$ of the light beams La and Lb. When the widths of the wavelength ranges $\Delta\lambda a$ and $\Delta\lambda b$ of the light beams La and Lb differ with each other, the sampling pitches of the interference signals ISa and ISb differ with each other. In such a case, a value of "0" is inserted to the interference signal ISa obtained from the light beam La having a narrower wavelength range for the shortfall of the wavelength range to equalize the widths of the wavelength ranges $\Delta\lambda a$ and $\Delta\lambda b$.

Here, the description has been made of a case in which the average value of the intermediate tomographic information ra(z) and rb(z) is calculated. Alternatively, the tomographic information r(z) may be generated using the product of the intermediate tomographic information ra(z) and rb(z). Then, strongest signal components of the intermediate tomographic information ra(z) and rb(z) are strengthened, so that the signal value of noise component is relatively reduced and a high quality tomographic image may be obtained. Further, various other methods may be used for generating the tomographic information r(z) at each depth position using the intermediate tomographic information ra(z) and rb(z), and obtaining a tomographic image.

In the present embodiment, the description has been made of a case in which tomographic information is obtained using the average or product of the intermediate tomographic information ra(z) and rb(z). But, by combining the ra(z) and rb(z) considering the wavelength ranges in which the interference signals ISa and ISb are obtained using spectral information of the light beams La and Lb outputted from the light source unit 10, the resolution of the reflected intensity r(z) may be increased. That is, ra(z) and rb(z) obtained by Fourier transform of the interference signals ISa and ISb, true tomographic information r(z), and Fourier transforms ha(z) and hb(z) of the spectral shapes of the light beams La and Lb are in the following relationship.

$$ra(z)=r(z) \otimes ha(z) \quad (2)$$

$$rb(z)=r(z) \otimes hb(z) \quad (3)$$

$\otimes$ denotes convolution operation

These may be deployed to $ra=[ra(0), ra(1\times dza), ---]^T$, $rb=[rb(0), rb(1\times dzb) ---]^T$, and $r=[r(0), r(1\times dz) ---]^T$, and expressed in discrete representations, then $$Ha \cdot r = ra \quad (4)$$

$$Hb \cdot r = rb \quad (5)$$

where, Ha and Hb are matrices formed of each vector of $ha=[ha(0), ha(1\times dz), ---]$, and $hb=[hb(0), hb(1\times dz), ---]$ arranged by displacing the element thereof. Through a known technology, such as iteration method, the tomographic information r may be obtained as the optimum solution of the relational expressions.

As described above, by calculating the tomographic information r(z) from the relational expressions in consideration of the difference in the wavelength between the light beams La and Lb outputted from the light source unit 10, the tomographic information r(z) may be calculated more accurately, thereby a high resolution tomographic image may be generated.

Next, an example operation of the optical tomographic imaging apparatus 1 will be described with reference to FIGS. 1 to 7. The light beam La, swept in wavelength within the wavelength range $\Delta\lambda a$ at a constant period, is outputted from the light source 10a, and inputted to the beam splitting means 3a guided by the optical fiber FB1a. In the beam splitting means 3a, the light beam La is split into the measuring beam L1a and reference beam L2a. The measuring beam L1a is outputted to the side of the optical fiber FB2a, and the reference beam L2a is outputted to the side of the optical fiber FB3a. The measuring beam L1a is guided by the optical fiber FB2a to the circulator 15a, and after the circulator 15a, it is guided by the optical fiber FB4a and inputted to the wavelength combining/splitting means 5.

In the mean time, the light beam Lb, swept in wavelength within the wavelength range $\Delta\lambda b$ at a constant period, is outputted from the light source 10b and inputted to the beam splitting means 3b guided by the optical fiber FB1b. The light beam Lb is split into the measuring beam L1b and reference beam L2b by the beam splitting means 3b. The measuring beam L1b is outputted to the side of the optical fiber FB2b, and the reference beam L2b is outputted to the side of the optical fiber FB3b. The measuring beam L1b is guided by the optical fiber FB2b to the circulator 15b, then inputted to the wavelength combining/splitting means 5 guided by the optical fiber FB4b.

The measuring beam L1a and measuring beam L1b are combined together in the wavelength combining/splitting means 5, guided by the optical fiber FB5, and inputted to the probe 30 through the optical connector 31. Then, the combined beam is guided by the probe 30 and irradiated onto the measuring object S. Thereafter, reflected beam L3a and reflected beam L3b reflected from each depth position z of the measuring object S are inputted to the probe 30, then propagated along the reverse path of the measuring beam and inputted to the wavelength combining/splitting means 5.

Since the cut-off wavelength of the wavelength combining/splitting means 5 is set within the wavelength range $\Delta$ in FIG. 2 as described above, the reflected beams L3a, L3b is split into reflected beam L3a' and reflected beam L3b' by the wavelength combining/splitting means 5, and the reflected beam L3a' is outputted to the side of the optical fiber FB4a, and the reflected beam L3b' is outputted to the side of the optical fiber FB4b.

The reflected beam L3a' guided by the optical fiber FB4a is inputted to the circulator 15a, then guided by the optical fiber FB6a and inputted to the beam combining means 4a. In the mean time, the reference beam L2a split by the beam splitting means 3a is inputted to the beam combining means 4a after the optical path length thereof is changed by the optical path length adjustment means 20a provided in the middle of the optical fiber FB3a.

The reflected beam L3a' and the reference beam L2a are combined together in the beam combining means 4a, and interference beam L4a generated through the light combination is divided into halves and inputted to the interference beam detection means 40a. In the interference beam detection means 40a, balanced detection is performed for the interference beam L4a and photoelectrically converted, thereby an interference signal ISa is generated and outputted to the tomographic image processing means 50.

Likewise, the reflected beam L3b' guided by the optical fiber FB4b is inputted to the circulator 15b, then guided by the optical fiber FB6b and inputted to the beam combining means 4b. In the mean time, the reference beam L2b split by the beam splitting means 3b is inputted to the beam combining means 4b after the optical path length thereof is changed by the optical path length adjustment means 20b provided in the middle of the optical fiber FB3b.

The reflected beam L3b' and the reference beam L2b are combined together in the beam combining means 4b, and interference beam L4b generated through the light combination is divided into halves and inputted to the interference beam detection means 40b. In the interference beam detection means 40b, balanced detection is performed for the interference beam L4b and photoelectrically converted, thereby an interference signal ISb is generated and outputted to the tomographic image processing means 50.

In the tomographic image processing means 50, intermediate tomographic information ra(z) and intermediate tomographic information rb(z) at each depth position are detected using the interference beam ISa and interference beam ISb, and tomographic information r(z) used for generating an tomographic image is calculated from the tomographic information ra(z) and rb(z), thereby a two dimensional optical tomographic image is generated. The generated tomographic image is displayed on the display unit 60, which includes a CRT (Cathode Ray Tube), a liquid crystal display, or the like connected to the tomographic image processing means 50.

As described above, according to the optical tomographic imaging apparatus 1, the light beams La and Lb, having different wavelengths with each other and swept in wavelength at the same time, are irradiated onto the measuring object S, and a plurality of interference beams L4a and L4b having different wavelengths generated when the light beams are irradiated onto the measuring object S is detected using different interference beam detection means 4a an 4b with respect to each of the wavelength ranges. This allows a high resolution image to be obtained rapidly.

In the present embodiment, a beam combining/splitting means that varies in transmission characteristics with wavelength, such as a WDM coupler, is used in order to utilize the light beams more effectively. But the advantageous effects of the present invention are not lost even when a beam combining/splitting means that does not dependent on wavelength is used.

Further, in the present embodiment, the description has been made of a case in which a portion of the wavelength range of each of the light beams outputted from different light sources overlaps with each other. But the present invention may also be applied to the light beams having different wavelength ranges that do not overlap with each other. In this case, the cut-off wavelength of the WDM coupler of the wavelength combining/splitting means 5 may be set within the wavelength ranges separated with each other.

Figure 8:
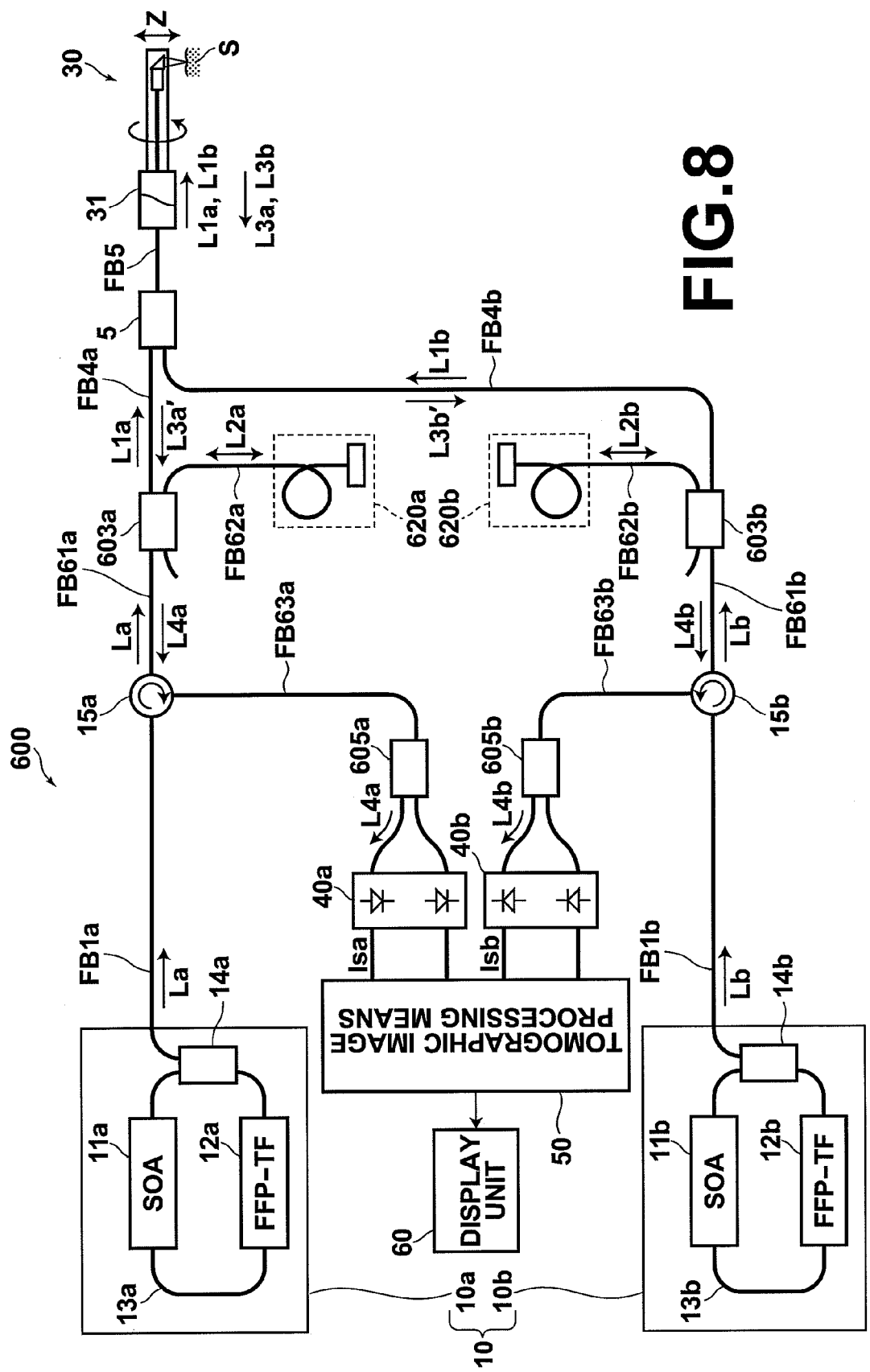
FIG. 8 is a schematic configuration diagram of the optical tomographic imaging apparatus according to a second embodiment of the present invention.

Next, the optical tomographic imaging apparatus 600 according to a second embodiment of the present invention will be described with reference to FIG. 8. FIG. 8 is a schematic configuration diagram of the optical tomographic imaging apparatus 600. The optical tomographic imaging apparatus 600 is a SS-OCT system using a Michelson interferometer. In the optical tomographic imaging apparatus 600 in FIG. 8, components identical to those of the optical tomographic imaging apparatus of the previous embodiment are given the same reference symbols and will not elaborated upon further here.

In the optical tomographic imaging apparatus 600, the light beam La outputted from the light source 10a is guided by the optical fiber FB1a to the circulator 15a, and after the circulator 15a, it is guided by the optical fiber FB61a and inputted to the beam splitting means 603a. The beam splitting means 603a includes, for example, a 2×2 optical coupler with a branching ratio of 90:10. The beam splitting means 603a of the present embodiment functions also as a beam combining means. The beam splitting means 603a splits the light beam La into the measuring beam L1a and reference beam L2a at a ratio of 90:10. The measuring beam L1a is outputted to the side of the optical fiber FB4a, and the reference beam L2a is outputted to the side of the optical fiber FB62a. The measuring beam L1a guided by the optical fiber FB4a is inputted to the wavelength combining/splitting means 5.

The light beam Lb outputted from the light source 10b and guided by the optical fiber FB1b is inputted to the circulator 15b, then guided by the optical fiber FB61b and inputted to the beam splitting means 603b. The beam splitting means 603b includes, for example, a 2×2 optical coupler with a branching ratio of 90:10. The beam splitting means 603b of the present embodiment functions also as a beam combining means. The beam splitting means 603b splits the light beam Lb into the measuring beam L1b and reference beam L2b at a ratio of 90:10. The measuring beam L1b is outputted to the side of the optical fiber FB4b, and the reference beam L2b is outputted to the side of the optical fiber FB62b. The measuring beam L1b guided by the optical fiber FB4b is inputted to the wavelength combining/splitting means 5.

The measuring beam L1a and measuring beam L1b are combined together in the wavelength combining/splitting means 5, guided by the optical fiber FB5, and inputted to the probe 30 through the optical connector 31. Then, the combined beam is guided by the probe 30 and irradiated onto a measuring object S. Thereafter, reflected beam L3a and reflected beam L3b reflected from each depth position z of the measuring object S are inputted to the probe 30, then propagated along the reverse path of the measuring beam and inputted to the wavelength combining/splitting means 5. The reflected beams L3a, L3b are split into reflected beam L3a' constituted by most of the reflected beam L3a and a portion of the reflected beam L3b adjacent to the cut-off wavelength, and reflected beam L3b' constituted by most of the reflected beam L3b and a portion of the reflected beam L3a adjacent to the cut-off wavelength respectively. The reflected beam L3a' is outputted to the side of the optical fiber FB4a and inputted to the beam splitting means 603a and the reflected beam L3b' is outputted to the side of the optical fiber FB4b and inputted to the beam splitting means 603b.

In the mean time, the reference beam L2a is subjected to change in the optical path length by a reflective optical path length adjustment means 620a connected to the distal end of the optical fiber FB62a, guided again by the optical fiber FB62a, and inputted to the beam splitting means 603a. The reference beam L2b is subjected to change in the optical path length by a reflective optical path length adjustment means 620b connected to the distal end of the optical fiber FB62b, guided again by the optical fiber FB62b, and inputted to the beam splitting means 603b.

The reflected beam L3a' and the reference beam L2a are combined together in the beam splitting means 603a, and the interference beam L4a is generated, which is guided by the optical fiber FB61a and inputted to the circulator 15a, then guided by the optical fiber FB63a and inputted to a beam splitting means 605a. The beam splitting means 605a includes, for example, a 2×2 optical fiber coupler with a branching ratio of 50:50. The interference beam L4a is split into halves and inputted to the interference beam detection means 40a.

Likewise, the reflected beam L3b' and the reference beam L2b are combined together in the beam splitting means 603b, and the interference beam L4b is generated, which is guided by the optical fiber FB61b and inputted to the circulator 15a, then guided by the optical fiber FB63b and inputted to a beam splitting means 605b. The beam splitting means 605b includes, for example, a 2×2 optical fiber coupler with a branching ratio of 50:50. The interference beam L4b is split into halves and inputted to the interference beam detection means 40b.

The structures and operations of the interference beam detection means 40a and 40b, and tomographic image processing means 50 are identical to those in the first embodiment, so that they will not be elaborated upon further here.

In the embodiments above, description has been made of a case in which a fiber ring type wavelength swept light source is used as the light source unit for the SS-OCT measurement. Other types of wavelength swept light sources may also be used. For example, a wavelength scanning light source that uses a diffraction grating, polygon, bandpass filter, or the like as the wavelength selection means and a rare-earth doped fiber, or the like as the gain medium may also be employed. Although, continuous sweep is desirable, discontinuous wavelength sweep may also be used.

Further, description has been made of a case in which the spectrum of the light beam outputted from the light source unit has a Gaussian shape. But it is not limited to this, and it may be, for example, a spectrum having a constant light intensity with respect to each wavelength.

The optical tomographic imaging apparatuses according to the first and second embodiments, and a modification thereof are all SS-OCT systems. As described under Description of the Related Art, the SS-OCT system is superior to the SD-OCT system in measuring rate. More specifically, assuming, for example, an OCT system with a wavelength range of 200 nm and a wavelength resolution of 0.1 nm, more than 2000 data points are required in order to obtain a high resolution optical tomographic image, and more than 4000 data points are desirable in order to know the spectral shape more accurately. Further, it is desirable that the OCT system may display a two dimensional tomographic image as a motion image. For example, when an image with 2000 data points within the measuring wavelength range and 1000 lines in the direction orthogonal to the optical axis is displayed at an iteration rate of 10 Hz, a data readout rate of 20 MHz is required.

As described above, in the SD-OCT system, in order to increase the number of data points, it is necessary to increase the number of elements of the detector. One of the currently available detector arrays of InGaAs elements having light receiving sensitivity at near infrared region is a detector array with 1024 elements (for example, Model Number: SU-LDV-1024LE, manufactured by Sensors Unlimited Inc.), but such detector array is expensive. In order to obtain more than 2000 data points, or more than 4000 data points, at least two, and preferably four expensive 1024-element detector arrays are required. Further, highly accurate positional alignment is required when a plurality of detector arrays is connected. Still further, the comparison result of the specifications between the 1024-element detector array described above and a 512-element detector array (Model Number: SU-LDV-512LD, manufactured by Sensors Unlimited Inc.) shows that the maximum line rate is 12820 frames/second for the 512-element detector array, while that of the 1024-element detector array is 4266 frames/second, which shows that the readout rate for a single line decreases as the number of elements is increased. The decrease in the readout rate for a single line poses a problem that the frame rate of an image is decreased.

In contrast, in the SS-OCT system, the increase in the data points may be realized inexpensively by increasing the sampling interval of the detector. In the example described above, when an image with 1000 lines in the direction orthogonal to the optical axis is displayed at an iteration rate of 10 Hz, if data points are 4000, then data need to be obtained with a sampling rate of 40 MHz, which may be readily realized with a single photodiode element and an inexpensive electrical circuit.

When broadening the bandwidth of the measuring beam, the SD-OCT system requires an optical design change, such as a wavelength dispersion element, such as grating, of the interference beam detection means, and light focusing element, such as a lens, whereas in the SS-OCT system, the broadening of the bandwidth may be realized easily, since it only requires the addition of a WDM coupler and detector.

Figure 9:
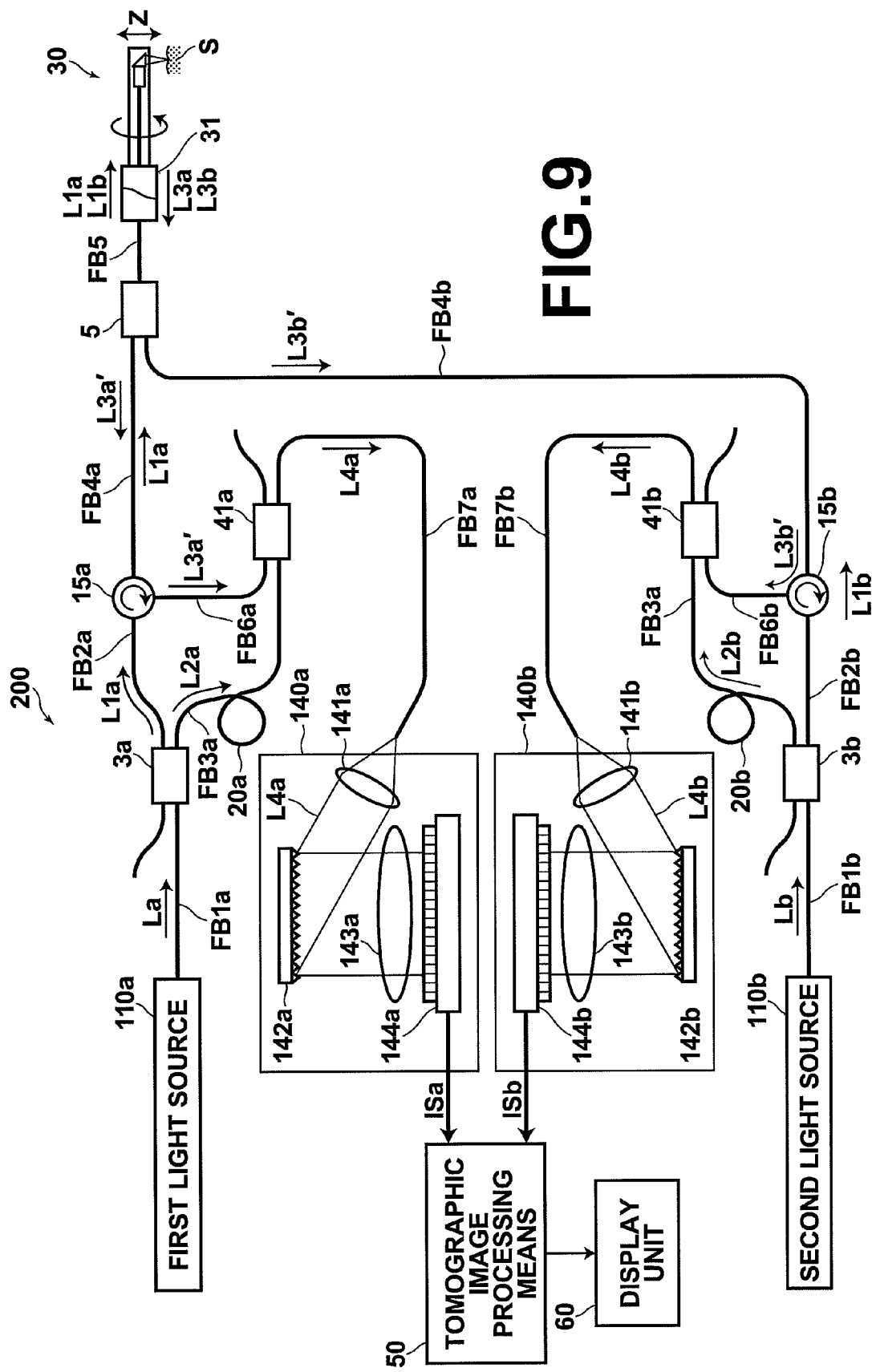
FIG. 9 is a schematic configuration diagram of the optical tomographic imaging apparatus according to a third embodiment of the present invention.

Next, the optical tomographic imaging apparatus 200 according to a third embodiment of the present invention will be described with reference to FIG. 9. FIG. 9 is a schematic configuration diagram of the optical tomographic imaging apparatus 200. The optical tomographic imaging apparatus 200 obtains a tomographic image by the SD-OCT (Spectral Domain OCT) measurement using a Mach-Zehnder interferometer. In the optical tomographic imaging apparatus 200 in FIG. 9, components identical to those of the optical tomographic imaging apparatuses of the previous embodiments are given the same reference symbols and will not be elaborated upon further here.

The optical tomographic imaging apparatus 200 differs from the optical tomographic imaging apparatus 1 in the structure of the light source and interference beam detection means. The light source unit 10 (10a and 10b) in FIG. 1 is a wavelength swept light source in which laser beams are outputted while the wavelength thereof is swept at a constant period, whereas first light source 110a and a second light source 110b are broadband low coherence light sources. The light sources 110a and 110b output light beams La and Lb, each having a different wavelength range, and a portion of each of the wavelength ranges overlaps with each other. Hereinafter, specific description will be provided below of a case in which a portion of each of the wavelength ranges overlaps with each other as illustrated in FIG. 2B.

The light beam La outputted from the light source 110a is guided by the optical fiber FB1a and inputted to the beam splitting means 3a. In the beam splitting means 3a, the light beam La is split into the measuring beam L1a and reference beam L2a. The measuring beam L1a is outputted to the side of the optical fiber FB2a, and the reference beam L2a is outputted to the side of the optical fiber FB3a. The measuring beam L1a is guided by the optical fiber FB2a to the circulator 15a, and after the circulator 15a, it is guided by the optical fiber FB4a and inputted to the wavelength combining/splitting means 5.

In the mean time, the light beam Lb outputted from the light source 110b is guided by the optical fiber FB1b and inputted to the beam splitting means 3b. In the beam splitting means 3b, the light beam Lb is split into the measuring beam L1b and reference beam L2b. The measuring beam L1b is outputted to the side of the optical fiber FB2b, and the reference beam L2a is outputted to the side of the optical fiber FB3b. The measuring beam L1b is guided by the optical fiber FB2b to the circulator 15b, and after the circulator 15b, it is guided by the optical fiber FB4b and inputted to the wavelength combining/splitting means 5.

The measuring beam L1a and measuring beam L1b are combined together in the wavelength combining/splitting means 5, guided by the optical fiber FB5, and inputted to the probe 30 through the optical connector 31. Then, the combined beam is guided by the probe 30 and irradiated onto a measuring object S. Thereafter, the reflected beam L3a and reflected beam L3b reflected from each depth position z of the measuring object S are inputted to the probe 30, then propagated along the reverse path of the measuring beam and inputted to the wavelength combining/splitting means 5.

The reflected beams L3a and L3b are split by the wavelength combining/splitting means 5, and one of the split reflected beams becomes reflected beam L3a' constituted by most of the reflected beam L3a and a portion of the reflected beam L3b adjacent to the cut-off wavelength which is outputted to the side of the optical fiber FB4a and inputted to the beam combining means 41a via the circulator 15a. The other of the reflected beams split by the wavelength combining/splitting means 5 becomes reflected beam L3b' constituted by most of the reflected beam L3b and a portion of the reflected beam L3a adjacent to the cut-off wavelength which is outputted to the side of the optical fiber FB4b and inputted to the beam combining means 41b via the circulator 15b.

Each of the beam combining means 41a and 41b includes, for example, a 2×2 optical fiber coupler with a branching ratio of 90:10. The beam combining means 41a combines the reflected beam L3a' and reference beam L2a at a ratio of 90:10, and outputs the interference beam L4a generated therein to the interference beam detection means 140a through the optical fiber FB7a. Since the light beams La and Lb are those outputted from different light sources, only the component of reflected beam L3a of the reflected beam L3a' contributes to the interference with the reference beam L2a, and the component of reflected beam L3b is the offset light component that does not interfere with the reference beam L2a. The beam combining means 41b combines the reflected beam L3b' with the reference beam L2b and outputs the interference beam L4b generated thereby to the interference beam detection means 140b, but only the component of reflected beam L3b of the reflected beam L3b' contributes to the interference with the reference beam L2b, and the component of reflected beam L3a is the offset light component that does not interfere with the reference beam L2b.

The interference beam detection means 140a has a function to detect a plurality of interference signals ISa within a wavelength range $\lambda 1$ of the light beam La by photoelectrically converting the interference beam L4a guided through the optical fiber FB7a. More specifically, the interference beam detection means 140a includes a spectroscopic element 142a that disperses the interference beam L4a, and a beam detection section 144a that detects the interference beam L4a dispersed by the spectroscopic element 142a. The spectroscopic element 142a includes, for example, a diffractive optical element, which disperses the interference beam L4a inputted from the optical fiber FB7a through a collimator lens 141a, and outputs to the beam detection section 144a through an optical lens 143a.

The beam detection section 144a includes a plurality of beam detection elements 144a, such as InGaAs photodiodes, disposed one or two dimensionally, and each beam detection element 144a detects the interference beam L4a dispersed into each frequency component by the spectroscopic element 142a and inputted through the optical lens 143a. Then, the beam detection section 144a detects the first interference signal ISa from the interference beam L4a. At this time, the interference signal ISa of the spectrum of the light source unit 110a is observed in the interference beam detection means 140a.

The interference beam detection means 140b is structured in the same manner as the interference beam detection means 140a, and includes a collimator lens 141b, a spectroscopic element (diffraction grating element) 142b, an optical lens 143b, and a beam detection section 144b.

The structure and operation of the tomographic image processing means 50 are identical to those of the first embodiment, so that they will not be elaborated upon further here.

For example, if the first light source 110a includes an AlGaAs SLD (Super Luminescence Diode) that outputs a light beam La having an emission wavelength range $\lambda 1 = 770$ to 810 nm, and the second light source 110b includes an InGaAsP SLD having an emission wavelength range $\lambda 2 = 1380$ to 1420 nm, the beam detection section 144a to which a wavelength range $\Delta\lambda 1$ is inputted includes a Si photodiode array, and the beam detection section 144b to which a wavelength range $\Delta\lambda 2$ is inputted includes an InGaAs photodiode array.

The number of grooves of the diffraction grating elements 142a and 142b is optimized to the respective wavelength ranges $\Delta\lambda 1$ and $\Delta\lambda 2$.

In this way, if a plurality of interferometers is provided, and wavelength ranges $\lambda 1$ and $\lambda 2$ are detected by different interference beam detection means 140, the detector elements of the interference beam detection means 140a and 140b do not need to cover an ultra-broadband region. This allows a higher quality tomographic image to be obtained, and a readout rate for a single line may be increased by measuring a plurality of wavelengths independently.

Further, with the use of a plurality of interference signals ISa and ISb obtained from a plurality of light beams outputted from the simply structured light source unit 110, a high quality tomographic image identical to that obtained with the use of broadband spectrum light may be obtained without using a light source that outputs broadband spectrum light as in the conventional SD-OCT measurement.

In the first to third embodiments above, the description has been made of a case in which two combinations of light source and interference beam detection means are employed. But, three or more combinations of light source and interference beam detection means may be employed. In that case, an N×1 WDM coupler or a star coupler capable of combining/splitting three or more light beams may be used in the wavelength combining/splitting means 5, and a tomographic image may be obtained using the average value of the intermediate tomographic information obtained from the three or more interference signals or the product of the intermediate tomographic information in the tomographic image processing means 50.

Figure 10A:
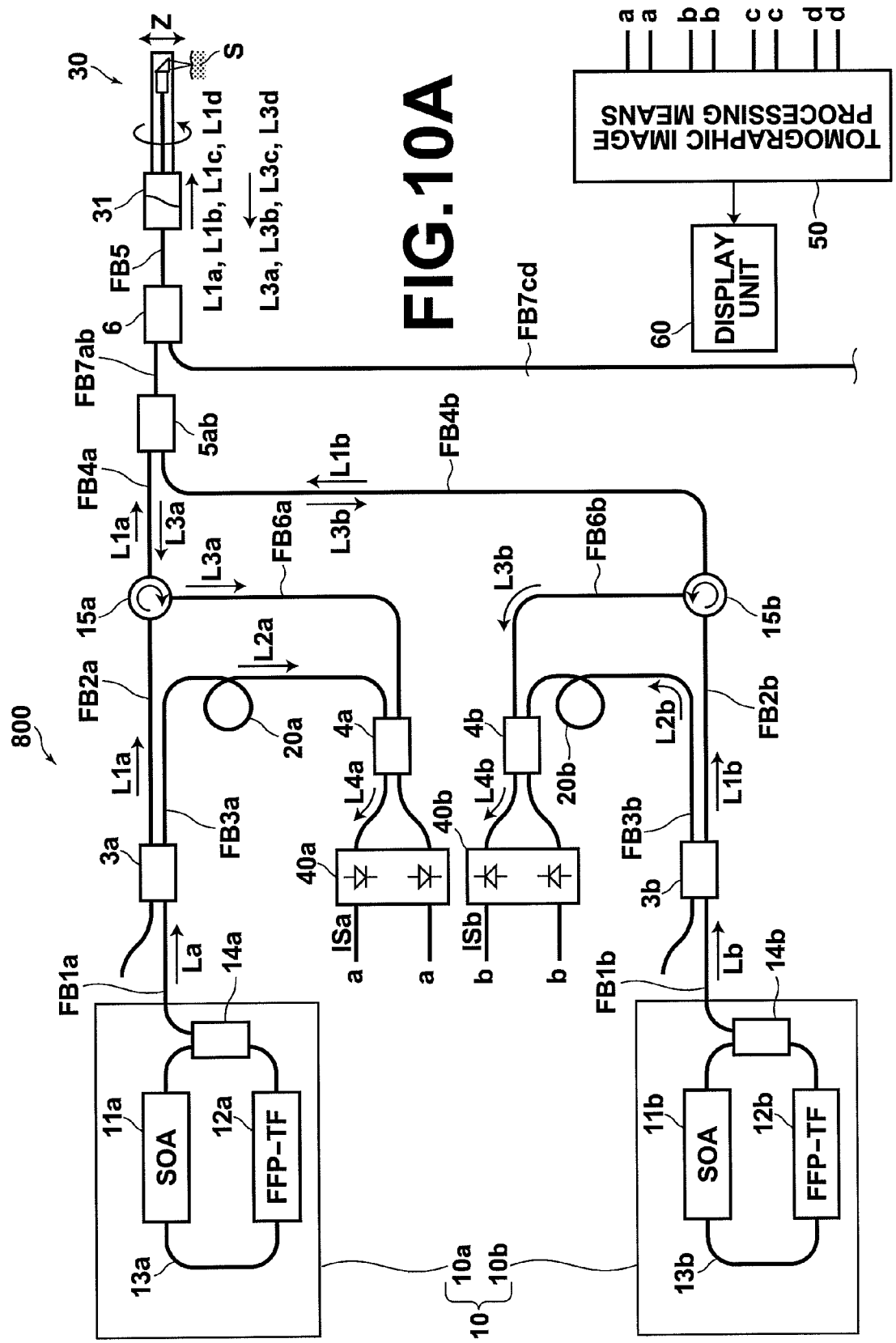
FIG. 10A is a schematic configuration diagram of the optical tomographic imaging apparatus according to a fourth embodiment of the present invention (part 1).
Figure 10B:
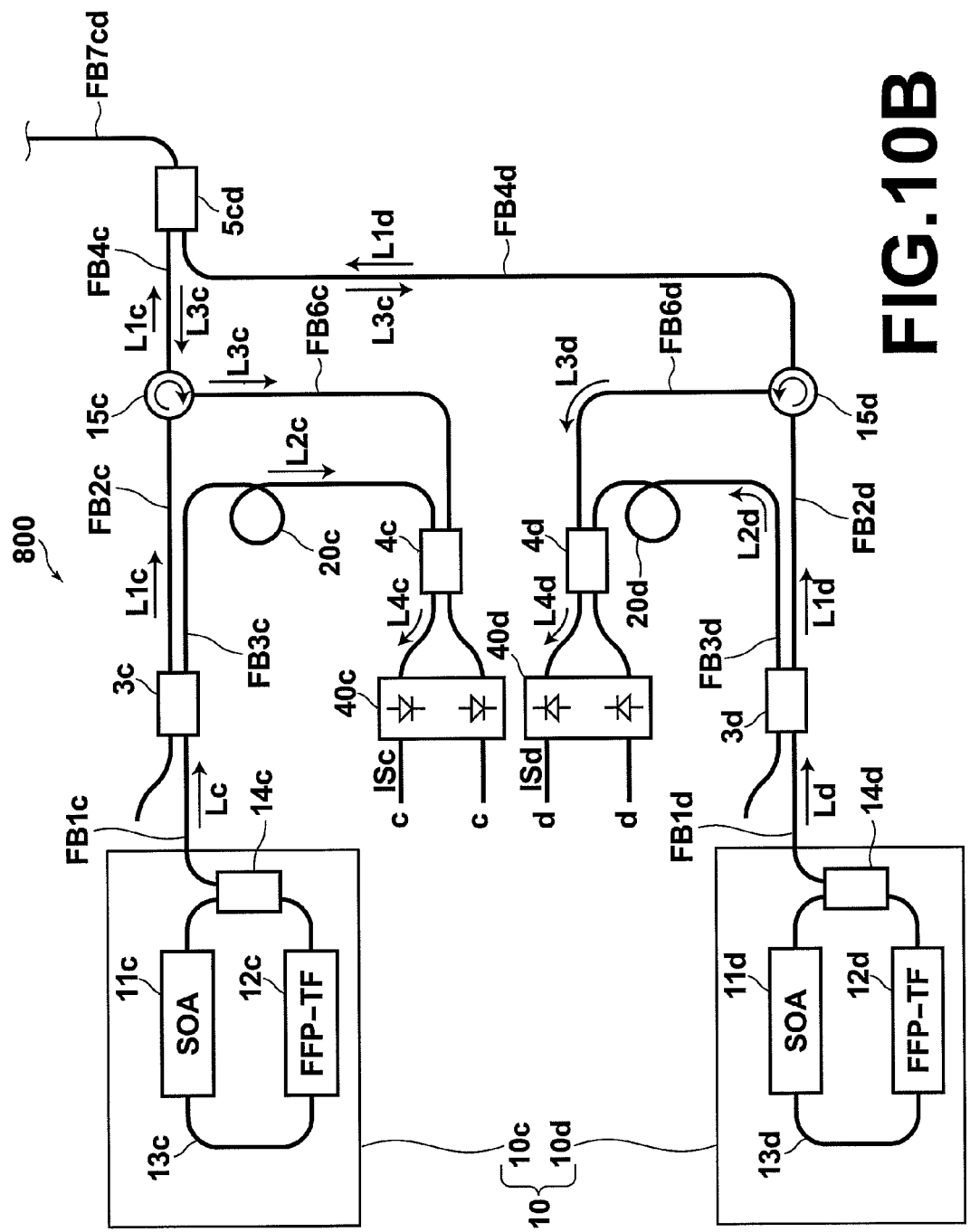
FIG. 10B is a schematic configuration diagram of the optical tomographic imaging apparatus according to a fourth embodiment of the present invention (part 2).

Next, the optical tomographic imaging apparatus 800 according to a fourth embodiment of the present invention will be described with reference to FIGS. 10a and 10b. FIGS. 10a and 10b are schematic configuration diagrams of the optical tomographic imaging apparatus 800.

In the fourth embodiment, the description will be made of a case in which four interference signals are obtained using four light sources in which two setups, each obtaining two interference signals using two light sources as illustrated in the first embodiment, are employed. In FIGS. 10a and 10b, identical components to those of the optical tomographic imaging apparatus according to the first embodiment are given the same reference symbols and will not be elaborated upon further here.

The optical tomographic imaging apparatus 800 includes: light source units 10a and 10b; beam splitting means 3a and 3b that split the light beams La and Lb into the measuring beam L1a and reference beam L2a, and measuring beam L1b and reference beam L2b respectively; light sources 10c and 10d; and beam splitting means 3c and 3d that split the light beams Lc and Ld into the measuring beam L1c and reference beam L2c, and the measuring beam L1d and reference beam L2d respectively. The optical tomographic imaging apparatus 800 further includes: a beam combining/splitting means 6 that combines the measuring beams L1a and L1b split by the beam splitting means 3a and 3b, and measuring beams L1c and L1d split by the beam splitting means 3c and 3d; beam combining means 4a, 4b, 4c, and 4d that combine reflected beams L3a', L3b' L3c', and L3d', obtained by splitting by the beam combining/splitting means 6 reflected beams L3a, L3b, L3c, and L3d from a measuring object S obtained by irradiating the measuring beams L1a, L1b, L1c and L1d combined by the beam combining/splitting means 6 onto the measuring object S, with reference beams L2a, L2b, L2c, and L2d respectively; interference beam detection means 40a, 40b, 40c, and 40d that perform detection on the respective beams; and a tomographic image processing means 50 that obtains a tomographic image of the measuring object S using interference signals ISa, ISb, ISc, and ISd detected by the interference beam detection means 40a, 40b, 40c, and 40d.

The beam combining/splitting means 6 includes, for example, a 2×2 optical coupler with a branching ratio of 50:50. The beam combining/splitting means 6 combines the measuring beams L1a and L1b guided thereto by the optical fiber FB7ab, and the measuring beams L1c and L1d guided thereto by the optical fiber FB7cd at a ratio of 50:50. In the mean time, the beam combining/splitting means 6 splits the reflected beams L3a, L3b, L3c, and L3d guided thereto by the optical fiber FB5 to the optical fibers FB7ab and FB7cd at a ratio of 50:50.

The measuring beams L1a and L1b combined by the wavelength combining/splitting means 5ab, and the measuring beams L1c and L1d combined by the wavelength combining/splitting means 5cd are further combined by the beam combining/splitting means 6 and irradiated onto the measuring object S. The reflected beams L3a, L3b, L3c, and L3d from the measuring object S are split by the beam combining/splitting means 6, and further split into reflected beams L3a', L3b', L3c', and L3d' in the wavelength ranges corresponding to the reference beams L2a, L2b, L2c, and L2d respectively by the wavelength combining/splitting means 5ab and wavelength combining/splitting means 5cd.

The reflected beams L3a', L3b', L3c', and L3d', and the reference beams L2a, L2b, L2c, and L2d are combined by the beam combining means 4a, 4b, 4c, and 4d respectively. Interference beam L4a, generated when the reflected beam L3a is combined with the reference beam L2a by the beam combining means 4a, is designated as interference signal ISa, interference beam L4b, generated when the reflected beam L3b is combined with the reference beam L2b by the beam combining means 4b, is designated as interference signal ISb, interference beam L4c, generated when the reflected beam L3c is combined with the reference beam L2c by the beam combining means 4c, is designated as interference signal ISc, and interference beam L4d, generated when the reflected beam L3d is combined with the reference beam L2d by the beam combining means 4d, is designated as interference signal ISb.

The four interference signals ISa, ISb, ISc, and ISd are inputted to the tomographic image processing means 50, and a tomographic image is obtained using the average value of intermediate tomographic information obtained from the four interference signals or the product of the intermediate tomographic information.

When three or more light sources are used as in the fourth embodiment, the use of a WDM coupler and a 2×2 optical coupler with a branching ratio of 50:50 may improve the light utilization efficiency at the boundary wavelength regions, in comparison with the case in which a star coupler capable of combining/splitting three or more beams is used in the wavelength combining/splitting means 5.

In the embodiments above, the description has been made of a case in which a fiber-ring type wavelength swept light source is used as the light source unit. But, other types of wavelength swept light sources may also be used. For example, an external resonator type wavelength swept laser light source, a wavelength swept semiconductor DFB laser light source, or a wavelength scanning light source using a diffraction grating, polygon, bandpass filter or the like as the wavelength selection means and a rare-earth doped optical fiber or the like as the gain medium may also be used. Continuous wavelength sweep is desirable, but discontinuous wavelength sweep may also be used.

In the embodiments above, the description has been made of a case in which a single light source is combined with a single interferometer. But an arrangement may be adopted in which a single interferometer is provided for a combined light beam including light beams from a plurality of light sources, and two or more such combinations are provided. For example, in the case of SD-OCT, a combined light beam combining light beams outputted from a plurality of SLDs may be regarded as the single light source unit, and in the case of SS-OCT, a plurality of wavelength swept light sources in which light emission is temporally separated with each other may be regarded as the single light source unit.

Further, the combination of the light source units may be a combination of SD-OCT and SS-OCT. That is, the advantageous effects of the present invention may be obtained even in the case where a wavelength swept light source is used as one of the light sources with a photodiode as the corresponding detector, and a low coherence light source is used as the other light source with a spectrometer including a spectroscopic element and a detector array as the corresponding detector.

Further, in the embodiments above, the description has been made of a case in which the light beam outputted from the light source unit has substantially a Gaussian shape, but the shape is not limited to this. For example, the light beam may have a spectrum having a constant light intensity with respect to each wavelength.

The emission wavelength range of a single light source is not limited to those illustrated as examples, but it should not be less than a predetermined wavelength range that allows OCT measurement using a single light source. There are no specific boundary values for the predetermined wavelength range, but if a system with a resolution less than in the order of approximately 1 mm is envisioned, it is in the order of approximately more than several tens of GHz in terms of the frequency band of the light.

Further, in the embodiments above, the description has been made of a case in which the light beams are guided by the optical fiber, and combined or split by the optical coupler or WDM coupler. Alternatively, a bulk optical system may be employed in which beam combining and splitting is performed spatially using a mirror, prism, dichroic mirror, dichroic prism, or the like. Instead of the optical fiber probe, a galvano mirror may be used to scan the spatially propagating beam.

Still further, in the embodiments above, the description has been made of a case in which reflected beam reflected from a measuring object or back scattered light is measured. But the present invention is also applicable to the case in which the measuring object is a transparent medium, such as a glass block, transparent film, or the like, and transmitted beam is measured instead of the reflected beam in order to derive the in-plane refractive index distribution, thickness distribution, birefringence, or the like.

What is claimed is:

1. An optical tomographic imaging apparatus, comprising
   a plurality of light source units, each for outputting a light beam having a continuous spectrum within a wavelength range, the light beams outputted from the plurality of light source units having wavelength ranges which are different from each other;
   a plurality of beam splitting means, each for splitting a corresponding one of the light beams outputted from the plurality of light source units into measuring and reference beams, the reference beams propagating through independent optical paths without mixing with each other, the measuring beams being irradiated onto the measuring object to produce a corresponding plurality of reflected beams reflected from the measuring object;
   a plurality of beam combining means, each for combining a corresponding one of the reflected beams with the corresponding reference beams that correspond to the corresponding reflected beam in terms of the wavelength range;
   a plurality of interference beam detection means, each for detecting a corresponding one of each of a plurality of interference beams generated when the corresponding reflected beam is combined with each of the corresponding reference beams by each of the beam combining means as a spectral interference signal; and
   a tomographic image processing means for generating a tomographic image of the measuring object by performing frequency analysis using the plurality of spectral interference signals detected by the plurality of interference beam detection means.

2. The optical tomographic imaging apparatus of claim 1, wherein the measuring beams into which the plurality of beam splitting means have split the light beams outputted from the plurality of light source units are irradiated onto the same region of the measuring object at the same time, and each of the beam combining means combines the reflected beam reflected from the measuring object with each of the corresponding reference beams.

3. The optical tomographic imaging apparatus of claim 2, wherein the apparatus further comprises
   a reflected beam splitting means for splitting each of the reflected beams into a plurality of beams according to the respective wavelength ranges of the light beams outputted from the plurality of light source units, and
   each of the beam combining means combines a corresponding one of the split reflected beams split by the reflected beam splitting means with the corresponding reference beam that corresponds to the corresponding split reflected beam in terms of the wavelength range.

4. The optical tomographic imaging apparatus of claim 1, wherein each of the interference beams generated in each of the beam combining means is divided into halves with the phases thereof shifted by 180 degrees with respect to each other and inputted to each of the interference beam detection means, and each of the interference beam detection means detects the spectral interference signal by performing balanced detection on the halved interference beams.

5. The optical tomographic imaging apparatus of claim 2, wherein each of the interference beams generated in each of the beam combining means is divided into halves with the phases thereof shifted by 180 degrees with respect to each other and inputted to each of the interference beam detection means, and each of the interference beam detection means detects the spectral interference signal by performing balanced detection on the halved interference beams.

6. The optical tomographic imaging apparatus of claim 3, wherein each of the interference beams generated in each of the beam combining means is divided into halves with the phases thereof shifted by 180 degrees with respect to each other and inputted to each of the interference beam detection means, and each of the interference beam detection means detects the spectral interference signal by performing balanced detection on the halved interference beams.

7. The optical tomographic imaging apparatus of claim 1, wherein each of the light beams is a laser beam swept in wavelength within the wavelength range at a constant period.

8. The optical tomographic imaging apparatus of claim 2, wherein each of the light beams is a laser beam swept in wavelength within the wavelength range at a constant period.

9. The optical tomographic imaging apparatus of claim 3, wherein each of the light beams is a laser beam swept in wavelength within the wavelength range at a constant period.

10. The optical tomographic imaging apparatus of claim 1, wherein each of the light beams is a low coherence light beam.

11. The optical tomographic imaging apparatus of claim 2, wherein each of the light beams is a low coherence light beam.

12. The optical tomographic imaging apparatus of claim 3, wherein each of the light beams is a low coherence light beam.

13. The optical coherence tomographic imaging apparatus of claim 1, wherein the tomographic image processing means includes a frequency analysis means that performs a frequency analysis on each of the interference beams to detect intermediate tomographic information at each depth position;
   a tomographic information processing means that generates true tomographic information from the intermediate tomographic information detected by the frequency analysis means; and
   a tomographic image generation means that generates a tomographic image using the true tomographic information generated by the tomographic information processing means.

* * * * *